Oct. 18, 1932.  E. J. ALBERT  1,883,444
TEMPERATURE INDICATING MEANS
Filed Nov. 26, 1926
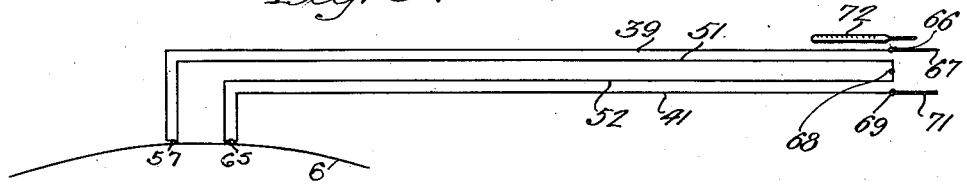
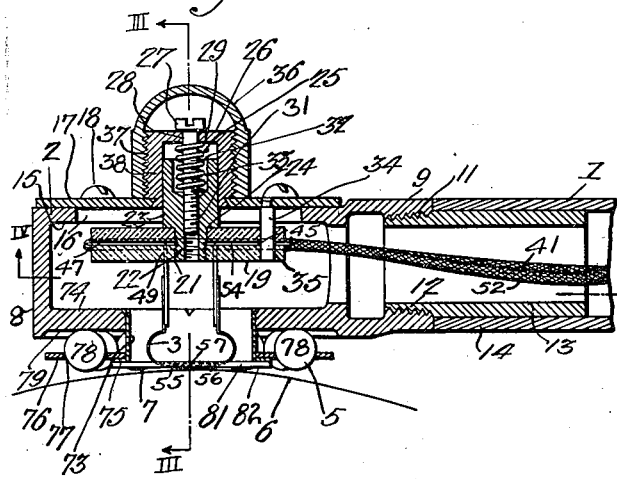
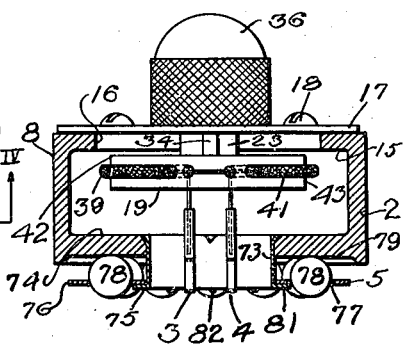
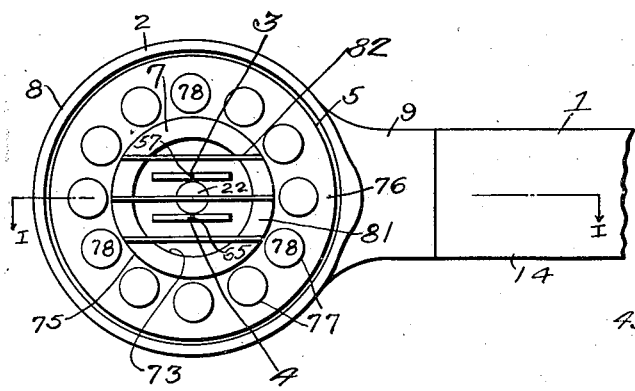
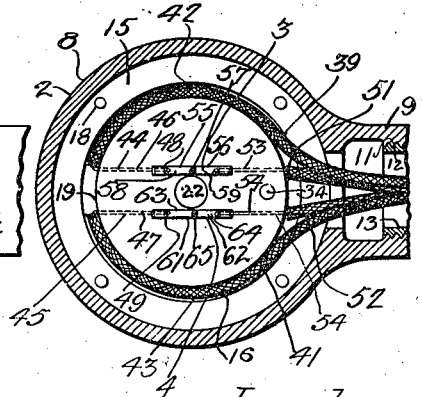

Patented Oct. 18, 1932

1,883,444

UNITED STATES PATENT OFFICE

EDWARD J. ALBERT, OF PHILADELPHIA, PENNSYLVANIA, ASSIGNOR TO THWING INSTRUMENT COMPANY, OF PHILADELPHIA, PENNSYLVANIA, A CORPORATION OF PENNSYLVANIA

TEMPERATURE INDICATING MEANS

Application filed November 26, 1926. Serial No. 150,872.

My invention relates to temperature indicating apparatus, and it has for one object the provision of an instrument that shall be particularly adapted to the measurement of the temperature of the rolls in a paper calendering machine.

In the manufacture of paper, it is extremely important that the temperature of the rolls in the calendering machine be maintained at a predetermined temperature. The practice, heretofore, has been to ascertain such temperatures by observing the pressure of the steam supplied to the rolls. Experience has shown, however, that such methods of measuring temperatures are unreliable, inasmuch as the steam supply pipes become clogged and the pressure readings are thereby rendered correspondingly inaccurate. Another object of my invention, therefore, is to provide means for overcoming these undesirable results.

A further object of my invention is the standardization of the indication of the temperature responsive means, whereby all such means may be interchangeable. To this end, the temperature responsive means or thermocouples are mounted on an adjustable support, so that during calibration, the thermocouples may be moved bodily relative to the desired object, rather than making changes in the standard instrument associated therewith. Thus, in the quantity production of temperature indicating means of the class described, all the thermocouples may be made alike as well as the galvanometers, final calibration being effected merely by adjusting the spacing of the thermocouples with respect to the surface of the device to be measured.

Other objects and applications of my invention, as well as details of construction and operation, will be apparent more fully hereinafter, when taken in connection with the accompanying drawing, wherein Fig. 1 is a longitudinal sectional view of one end of a temperature indicating instrument embodying my invention, the sectional plane being taken on the line I—I of Fig. 2;

Fig. 2 is a bottom plan view of the structure of Fig. 1;

Fig. 3 is a transverse sectional view taken on the line III—III of Fig. 1;

Fig. 4 is a horizontal sectional view taken on the line IV—IV of Fig. 1; and

Fig. 5 is a diagrammatic view of circuits and apparatus embodying my invention.

The temperature indicating apparatus shown in the drawing comprises broadly an elongated handle 1 which terminates in an enlarged head portion 2 providing a housing for thermocouples 3 and 4, the latter being supported on a lower side by anti-friction means 5 in spaced relation to a roll 6 and protected by means of a guard 7.

The housing 2, which comprises a cylindrical side wall 8, is provided with a tubular extension 9 having an internally threaded portion 11 adapted to engage a correspondingly threaded portion 12 of a tubular member 13. The member 13 is rigidly positioned in an adjacent outer end 14 of the elongated tubular handle 1.

The cylindrical side wall 8 is provided with an upper flange 15 forming a transverse opening 16 through which the thermocouples 3 and 4 may be removed when necessary. The opening 16 may be closed by means of a plate 17 secured in position by means of screws 18 which extend into the peripheral flange 15.

According to my invention, a cylindrical supporting member 19 is provided with a central threaded aperture 21 for the reception of a correspondingly threaded end portion 22 of a tubular member 23. The end portion 22 is of reduced diameter to provide a shoulder 24, whereby the members 19 and 23 may be rigidly secured together. The tubular member 23 slidably engages a recess 25 formed in a member 26 secured to the cover plate 17 and projecting vertically above the same. The position of the tubular member 23 in the recess 25 may be adjusted by means of a screw 27 which extends through an aperture 28 in a base portion 29 of the member 26 into engagement with a centrally threaded aperture 31 in the tubular member 23. Thus, the position of the member 19 may be varied merely by turning the screw 27. This movement may be facilitated by means of a spring 32, one end of which abuts against the base portion 29, while the other end abuts against the base of a recess 33 formed in the adjacent upper end of the tubular member 23.

The guiding effect of the member 26 on the members 19 and 23 may be supplemented by a pin 34 which extends downwardly from the closure plate 17 through an opening 35 formed in the member 19. The exposed head of the adjusting screw 27 may be protected by means of a cap 36 having an internally threaded portion 37 in engagement with a correspondingly threaded outer portion 38 of the member 26.

As shown in Figs. 1 and 4, a pair of flexible thermocouple wires 39 and 41 extend from the tubular handle 1 into the housing 2, where they are positioned on opposite sides 42 and 43, respectively, of the supporting member 19. The member 19 is provided at 44 and 45 with horizontal perforations for the passage of the extended portions 46 and 47 of the thermocouple wires 39 and 41, respectively.

A pair of vertical apertures 48 and 49 extend downwardly from the horizontal perforations 44 and 45, respectively, providing outlet passages for the extensions 46 and 47 which project downwardly into the air chamber formed by the housing 2, as illustrated in Figs. 1 and 3.

A second pair of flexible thermocouple wires 51 and 52 are somewhat similarly mounted and provided with extensions 53 and 54, respectively. The circuit for the thermocouple 3 is completed by extensions 55 and 56 from the supporting thermocouple wires 46 and 53, these extensions defining a junction point 57. End portions 58 and 59, adjacent to the junction point 57, are substantially flat and positioned in a common plane. The thermocouple 4 is of similar construction, and it is provided with extensions 61 and 62 forming a junction point 65 positioned in the plane of the flat portions 55 and 56 of the thermocouple 3.

As illustrated in Fig. 5, the pair of thermocouple wires 39 and 51, which constitute the elements of thermocouple 3, are respectively connected at 66 to one conductor 67 of an external circuit and at 68 to the thermocouple element 52. The other wire 54 of the thermocouple 4 is connected at 69 to the remaining wire 71 of the external circuit. A thermometer 72 may be positioned within the tubular handle 1 in immediate proximity to the connecting points 66, 68 and 69.

The anti-frictional means 5, which serves to support the thermocouple housing 2 on a moving object, as, for example, the roll 6, with a minimum friction, comprises a transversely extending tubular member 73, an upper end of which is rigidly supported on a horizontal flange 74 that extends inwardly from the cylindrical side wall 8 and constitutes a base for the housing chamber 2. A lower end of the member 73 is provided with a laterally extending flange 75, affording a supporting shoulder for a plate 76 having a plurality of apertures 77 adapted to serve as seats for balls 78.

The spacing of the plate 76 from a lower side 79 of the housing flange 74 serves to permit said flange to serve as a race-way for the balls 78. Thus, a frictional support is provided for the lower side of the housing 2, effective not only for a roll wherein the motion is about the center of the raceway but also for a roll as shown in the drawing, wherein the relative motion is transverse to the center of the bearing. In the latter case, the bearing is effective since the pressure on the opposite sides thereof is rarely the same, the resulting unbalanced forces causing a rotative movement. Moreover, the anti-friction balls 78 turn on their supporting plate 76.

Inasmuch as the plane of the substantially flat portions 55—56 and 61—62 of the thermocouple elements 3 and 4, respectively, lie in a plane very close to the object under test, a guard 81 is provided which may take the form of a plurality of bars 82. These bars may extend across the lower open end of the tube 73 substantially parallel to the flat thermocouple portions just mentioned and are secured to the supporting flange 75. Hence, the possibility of damaging the exposed portions of the thermocouples 3 and 4 is materially decreased.

In operation, the instrument is first calibrated by turning the screw member 27 to adjust the spacing of the thermocouples 3 and 4 relative to a standard object until the galvanometer (not shown), which is associated with conductors 66 and 67, indicates the correct temperature of the standard.

The advantages of such adjustment will be obvious to those skilled in the art. It not only permits quantity production of the parts in question but also greatly facilitates calibration. For example, all the thermocouples may be made alike and also the galvanometers. It will be noted also that the closure plate 17, the thermocouples 3, 4 and the means for adjustably supporting the same, together constitute a removable, interchangeable, temperature-responsive unit.

Assuming that the temperature of the roll 6 is to be ascertained, the operator supports the head 2 of the instrument on the roll 6, with the balls 78 in engagement therewith, and observes the reading of the galvanometer (not shown). The close spacing between the thermocouple junction points 57 and 65 and the adjacent surface of the roll 6 results in a maximum response by the thermocouples 3 and 4, with consequent accuracy in the temperature measurement. In addition, such heat as is developed by the anti-friction supporting means 5 is rendered substantially negligible by the relatively large air chamber afforded by the housing 2 which is positioned directly above the junction points 57 and 65.

Although I have described one embodiment of my invention in detail, and although I have pointed out certain of the most obvious principles and purposes thereof, I do not intend that the languages employed in the following claims shall be limited to the precise features described, but I intend that the claims shall be construed to cover all combinations which are fairly included in the language thereof, when read in connection with the prior art, regardless of the details and functions mentioned in the description or illustrated in the drawing.

I claim:

1. An instrument having a removable interchangeable unit comprising a closure element provided with a recess, a thermocouple supporting member extending into said recess and adapted to be guided thereby, means extending between said element and said member for causing a relative movement therebetween, and resilient means operative on said member.

2. A housing having a pair of openings, thermocouple elements having a junction point positioned adjacent to one of said openings, closure means for the other of said openings comprising a recessed member, a supporting member for said thermocouple element extending into said recessed member so as to be guided thereby, an adjusting screw having an exposed head operatively associating said members affording variations in the position of said junction point relative to said first-mentioned opening, and a protective housing for said exposed head.

3. A housing having a pair of openings, thermocouple elements having a junction point positioned adjacent to one of said openings, closure means for the other of said openings comprising a recessed member, a supporting member for said thermocouple element extending into said recessed member so as to be guided thereby, an adjusting element having an exposed head operatively associating said members affording variations in the position of said junction point relative to said first-mentioned opening, protective means for said exposed head, and a guiding pin extending from said closure means into operative relation to said supporting member.

EDWARD J. ALBERT.